United States Patent

Shea

(10) Patent No.: US 11,148,813 B2
(45) Date of Patent: Oct. 19, 2021

(54) LIQUID REHEATER HEAT EXCHANGER IN AN AIR CYCLE SYSTEM

(71) Applicant: Hamilton Sundstrand Corporation, Charlotte, NC (US)

(72) Inventor: Brian R. Shea, Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 746 days.

(21) Appl. No.: 15/944,164

(22) Filed: Apr. 3, 2018

(65) Prior Publication Data

US 2019/0300181 A1 Oct. 3, 2019

(51) Int. Cl.
| | |
|---|---|
| *B64D 13/08* | (2006.01) |
| *F25B 9/00* | (2006.01) |
| *F25B 9/06* | (2006.01) |
| *B64D 13/06* | (2006.01) |

(52) U.S. Cl.
CPC .............. *B64D 13/08* (2013.01); *F25B 9/004* (2013.01); *F25B 9/06* (2013.01); *B64D 13/06* (2013.01); *B64D 2013/0614* (2013.01); *B64D 2013/0625* (2013.01); *B64D 2013/0648* (2013.01); *B64D 2013/0662* (2013.01); *B64D 2013/0674* (2013.01); *Y02T 50/50* (2013.01)

(58) Field of Classification Search
CPC .......... F25B 9/004; F25B 9/006; B64D 16/06; B64D 16/08; B64D 2013/0603; B64D 2013/0618; B64D 2013/0648; B64D 2013/0678
See application file for complete search history.

(56) References Cited

U.S. PATENT DOCUMENTS

| | | |
|---|---|---|
| 5,343,692 A | 9/1994 | Thomson et al. |
| 5,906,111 A | 5/1999 | Lui |
| 6,250,097 B1 | 6/2001 | Lui et al. |
| 6,457,318 B1 | 10/2002 | Lui et al. |
| 6,460,353 B2 | 10/2002 | Udobot et al. |

(Continued)

FOREIGN PATENT DOCUMENTS

| | | |
|---|---|---|
| EP | 2319761 A2 | 5/2011 |
| JP | 2000344198 A | 12/2000 |

OTHER PUBLICATIONS

Extended European Search Report for EP Application No. 19166817.7; Report dated Jul. 25, 2019 (10 pages).

*Primary Examiner* — Jonathan Bradford
(74) *Attorney, Agent, or Firm* — Cantor Colburn LLP

(57) ABSTRACT

An environmental control system includes an airflow source, and an air cycle machine in flow communication with the airflow source, and through which an airflow from the airflow source is directed. The air cycle machine includes a compressor and a turbine. A liquid load heat exchanger is located in flow communication with the turbine such that airflow downstream of the turbine exchanges thermal energy with a liquid flow at the liquid load heat exchanger to cool the liquid flow. A liquid load reheater is located upstream of the turbine and upstream of the liquid load heat exchanger. The liquid load reheater is configured such that a thermal energy exchange between the airflow prior to the airflow entering the turbine and the liquid flow prior to the liquid flow entering the liquid load heat exchanger occurs at the liquid load reheater.

13 Claims, 1 Drawing Sheet

(56) References Cited

U.S. PATENT DOCUMENTS

| | | | |
|---|---|---|---|
| 6,526,775 B1 * | 3/2003 | Asfia | B64D 13/06 62/402 |
| 6,615,606 B2 | 9/2003 | Zywiak | |
| 6,848,261 B2 | 2/2005 | Claeys | |
| 8,915,095 B2 | 12/2014 | Bruno et al. | |
| 2006/0162371 A1 | 7/2006 | Lui et al. | |
| 2014/0352348 A1 | 12/2014 | Army, Jr. et al. | |
| 2017/0342838 A1 | 11/2017 | Bruno et al. | |

* cited by examiner

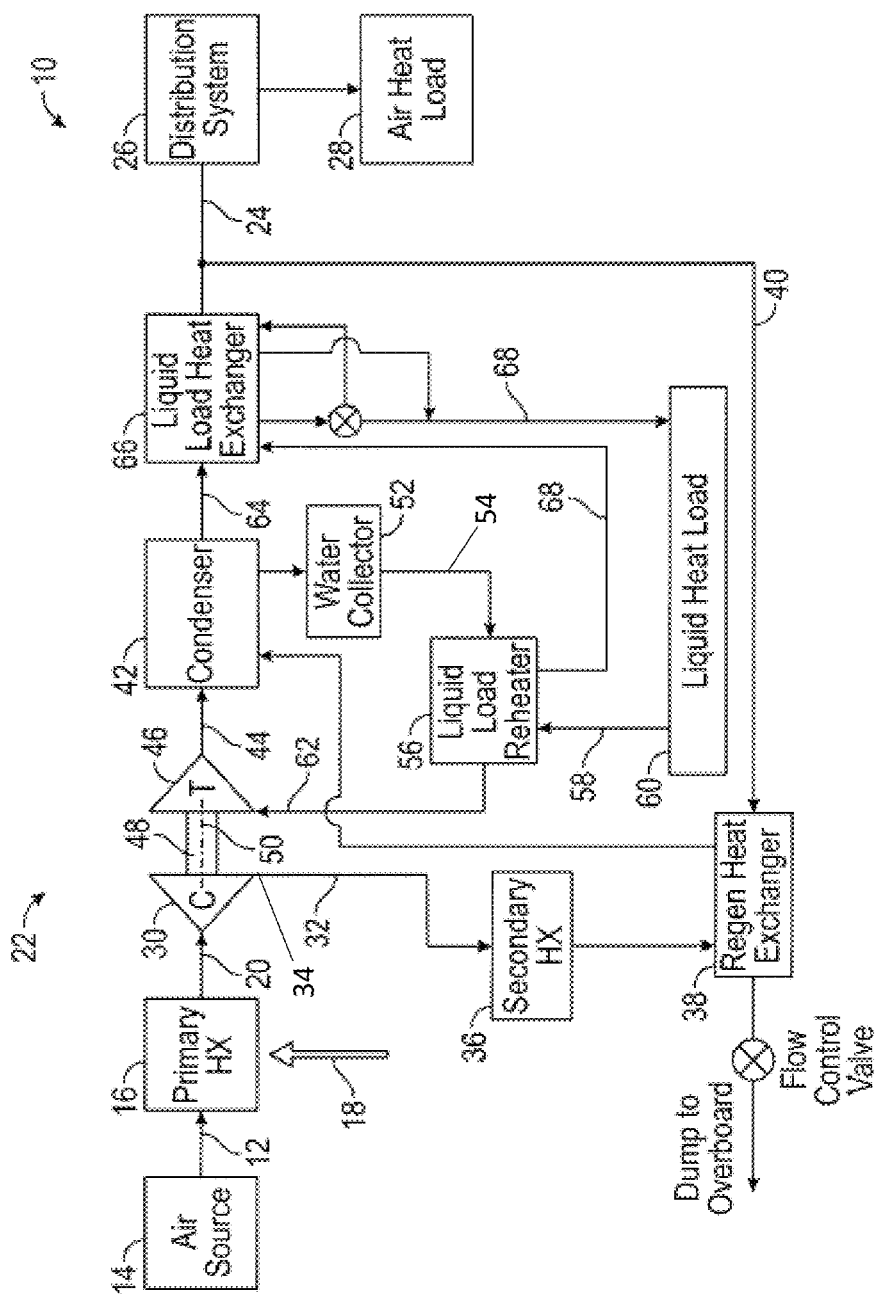

LIQUID REHEATER HEAT EXCHANGER IN AN AIR CYCLE SYSTEM

BACKGROUND

Exemplary embodiments pertain to the art of environmental control systems (ECSs), and more particularly to an ECS in which an air cycle subsystem is in a heat exchange relationship with one or more liquid cycle subsystems.

ECSs provide a supply of conditioned air to an enclosure, such as an aircraft cabin and cockpit. Conventional ECSs have utilized an air-to-air cycle cooling system which is in a heat exchange relationship with a liquid loop. The liquid loop typically cools other heat loads such as avionics packages or the like. Interaction between the air and liquid subsystems may be relatively complex.

In a conventional system, a flow of bleed air is taken from a bleed source, for example, an intermediate or high pressure stage of a gas turbine engine compressor. The bleed air is pre-cooled via an air-to-air heat exchanger with heat being rejected to RAM air. The pre-cooled bleed air is then flowed to a compressor of an air-cycle machine (ACM). After compression, the air flows through a second air-to-air heat exchanger, a regenerative heat exchanger, an air-to-air reheater heat exchanger, and an air-to-air condenser. Condensed water droplets are extracted by a water extractor and dehumidified air is routed to a turbine of the ACM. Expanded air from the turbine flows through the cold side of the condenser, and into a liquid-to-air heat exchanger of the liquid loop. The expanded air cools a liquid at the liquid-to-air heat exchanger, with the cooled liquid being utilized to cool liquid-cooled components. The air then flows to a distribution system and into the enclosure, and also through a second air-to-liquid heat exchanger on its way to the regenerative heat exchanger, after which the airflow is dumped overboard.

BRIEF DESCRIPTION

In one embodiment, an environmental control system includes an airflow source, and an air cycle machine in flow communication with the airflow source, and through which an airflow from the airflow source is directed. The air cycle machine includes a compressor and a turbine. A liquid load heat exchanger is located in flow communication with the turbine such that airflow downstream of the turbine exchanges thermal energy with a liquid flow at the liquid load heat exchanger to cool the liquid flow. A liquid load reheater is located upstream of the turbine and upstream of the liquid load heat exchanger. The liquid load reheater is configured such that a thermal energy exchange between the airflow prior to the airflow entering the turbine and the liquid flow prior to the liquid flow entering the liquid load heat exchanger occurs at the liquid load reheater.

Additionally or alternatively, in this or other embodiments a condenser is located between the turbine and the liquid load reheater, and is configured such that the airflow prior to entering the liquid load reheater is condensed.

Additionally or alternatively, in this or other embodiments a water collector is located between the condenser and the liquid load reheater to collect the water condensed from the airflow.

Additionally or alternatively, in this or other embodiments a regeneration heat exchanger is located downstream of the compressor, such that the airflow flows through the regeneration heat exchanger prior to flowing through the liquid load reheater.

Additionally or alternatively, in this or other embodiments a primary heat exchanger is located between the airflow source and the air cycle machine.

Additionally or alternatively, in this or other embodiments a secondary heat exchanger is located between the regeneration heat exchanger and the compressor.

Additionally or alternatively, in this or other embodiments the airflow exchanges thermal energy with a ram airflow at one or more of the primary heat exchanger or the secondary heat exchanger.

Additionally or alternatively, in this or other embodiments the airflow is output to an air cooling load after flowing through the liquid load heat exchanger.

Additionally or alternatively, in this or other embodiments the liquid flow is output to a liquid cooling load after flowing through the liquid load heat exchanger.

Additionally or alternatively, in this or other embodiments the compressor and the turbine are located at a common shaft.

In another embodiment, a method of operating an environmental control system includes extracting an airflow from an airflow source, compressing the airflow at a compressor of an air cycle machine, exchanging thermal energy between the airflow and a liquid flow at a liquid load reheater, directing the airflow through a turbine of the air cycle machine after flowing the airflow through the liquid load reheater, and exchanging thermal energy between the airflow and the liquid flow at a liquid load heat exchanger after the airflow exits the turbine, and after the liquid flow exits the liquid load reheater.

Additionally or alternatively, in this or other embodiments the airflow is flowed through a condenser prior to exchanging thermal energy between the airflow and the liquid flow at the liquid load reheater.

Additionally or alternatively, in this or other embodiments the airflow is flowed through a regeneration heat exchanger located downstream of the compressor, prior to flowing through the liquid load reheater.

Additionally or alternatively, in this or other embodiments the airflow is flowed through a primary heat exchanger located between the airflow source and the air cycle machine.

Additionally or alternatively, in this or other embodiments the airflow is flowed through a secondary heat exchanger located between the regeneration heat exchanger and the compressor.

BRIEF DESCRIPTION OF THE DRAWINGS

The following descriptions should not be considered limiting in any way. With reference to the accompanying drawings, like elements are numbered alike:

The FIGURE is a schematic illustration of an embodiment of an environmental control system.

DETAILED DESCRIPTION

A detailed description of one or more embodiments of the disclosed apparatus and method are presented herein by way of exemplification and not limitation with reference to the FIGURES.

Referring to the FIGURE, illustrated is an embodiment of an environmental control system (ECS) 10. The ECS 10 utilizes an airflow 12 extracted from a bleed source 14, which is in some embodiments one or more bleed ports to extract airflow from a compressor section of a gas turbine engine. One skilled in the art, however, will readily appreciate that the presently disclosed ECS 10 may utilize airflow 12 from other sources. The airflow 12 passes through a primary heat exchanger 16, which is an air-to-air heat exchanger. At the primary heat exchanger 16, the airflow is cooled via thermal energy exchange with a ram airflow 18 or other air sources such as engine fan bypass.

From a primary heat exchanger outlet 20 of the primary heat exchanger 16, the airflow 12 is directed to an air cycle machine 22. The air cycle machine 22 conditions the airflow 12 and directs an output airflow 24 to a distribution system 26, which distributes the output airflow 24 to an air-cooled load 28, such as a cabin or other compartment of an aircraft. The air cycle machine 22 includes a compressor 30, at which the airflow 12 is compressed. Compressed airflow 32 then proceeds from a compressor outlet 34 to a secondary heat exchanger 36. The compressed airflow 32 is cooled at the secondary heat exchanger 36, which is an air-to-air heat exchanger. In some embodiments, the compressed airflow 32 is cooled at the secondary heat exchanger 36 via thermal energy exchange with ram airflow 18 or other air sources such as engine fan bypass.

The compressed airflow 32 is directed from the secondary heat exchanger 36 to a regeneration heat exchanger 38, another air-to-air heat exchanger. The regeneration heat exchanger 38 utilizes excess cooling capacity of the ECS 10 to further cool the airflow 12. For example, in some embodiments, a portion of the output airflow 24 of the ECS 10 is diverted along a regeneration pathway 40 to the regeneration heat exchanger 38. At the regeneration heat exchanger 38, the compressed airflow 32 is cooled via thermal energy exchange with the portion of the output airflow 24.

From the regeneration heat exchanger 38, the compressed airflow 32 flows through a condenser 42 for thermal energy exchange with a turbine output airflow 44 of a turbine 46 of the air cycle machine 22. In some embodiments, the turbine 46 is disposed along a common shaft 48 with the compressor 30 and is configured to rotate therewith about a central axis 50. In other embodiments, the compressor 30 and the turbine 46 may reside at different shafts. At the condenser 42, the compressed airflow 32 exchanges thermal energy with the turbine output airflow 44, causing condensation in the compressed airflow 32, with the condensate collected at a water collector 52 downstream of the condenser. A dehumidified airflow 54 is directed from the water collector 52 though a liquid load reheater 56. The liquid load reheater 56 is an air to liquid heat exchanger, at which the dehumidified airflow 54 is heated via thermal energy exchange with return liquid flow 58 from a liquid heat load 60. The liquid load reheater 56 thus raises the turbine inlet temperature of the turbine 46, and at least partially cools the return liquid flow 58.

The dehumidified airflow 54 is directed from the liquid load reheater 56 to the turbine 46, flowing into a turbine inlet 62. The turbine 46 outputs the airflow as turbine output airflow 44 to the condenser 42 for thermal energy exchange with the compressed airflow 32 as described above. Condenser output airflow 64 is then directed through a liquid load heat exchanger 66. At the liquid load heat exchanger 66, the condenser output airflow 64 exchanges thermal energy with cooled return liquid flow 68 output from the liquid load reheater 56, thus further cooling the cooled return liquid flow 68, which is then directed to one or more liquid cooled heat loads 60. The condenser output airflow 64 is output from the liquid load heat exchanger 66 as output airflow 24, and is directed to the air-cooled load 28, such as a cabin or other compartment of an aircraft. As stated above a portion of the output airflow 24 may be selectably directed to the regeneration heat exchanger 38.

Use of a liquid load reheater 56 removes a heat load from the regeneration pathway 40 upstream of the regeneration heat exchanger 38, thereby allowing for colder regeneration heat exchanger outlet temperatures, as compared to a typical configuration having an air-to-air reheater and a separate liquid load heat exchanger in series on a regenerator line.

Depending upon system sizing, having the liquid load reheater 56 downstream of the water collector 52 instead of on the regeneration pathway 40 also removes the need to use regeneration heat exchanger 38 at cooler day types, instead relying on ram airflow 18 alone, thereby reducing bleed air extraction, since in that case all of the airflow 12 extracted from the bleed source 14 would be directed to the air-cooled load 28, with none diverted along the regeneration pathway 40.

Further, the Liquid load heat exchanger 56 takes the place of the air-to-air reheater, helping to raise turbine inlet temperatures after the water collector 52, while also cooling a portion of the return liquid flow 58.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system, comprising:
   an airflow source;
   an air cycle machine in flow communication with the airflow source, and through which an airflow from the airflow source is directed, the air cycle machine including:
      a compressor through which the airflow is directed and compressed into a compressed airflow; and
      a turbine;
   a liquid load heat exchanger located in flow communication with the turbine such that airflow downstream of the turbine exchanges thermal energy with a liquid flow at the liquid load heat exchanger to cool the liquid flow;
   a liquid load reheater disposed upstream of the turbine and upstream of the liquid load heat exchanger relative to the flow of compressed airflow, configured such that a thermal energy exchange between the compressed airflow prior to the compressed airflow entering the turbine and the liquid flow prior to the liquid flow entering the liquid load heat exchanger occurs at the liquid load reheater;

a condenser disposed downstream of the turbine and upstream of the liquid load reheater relative to a turbine output airflow, such that the compressed airflow is directed through the condenser for thermal energy exchange with the turbine output airflow, thus condensing water from the compressed airflow;

wherein the condenser is configured and positioned such that the turbine output flow flows through the condenser then flows through the liquid load heat exchanger.

2. The environmental control system of claim 1, further comprising a water collector disposed between the condenser and the liquid load reheater to collect the water condensed from the compressed airflow.

3. The environmental control system of claim 1, further comprising a regeneration heat exchanger disposed downstream of the compressor, such that the compressed airflow flows through the regeneration heat exchanger prior to flowing through the liquid load reheater.

4. The environmental control system of claim 3, further comprising a primary heat exchanger disposed between the airflow source and the air cycle machine.

5. The environmental control system of claim 4, further comprising a secondary heat exchanger disposed between the regeneration heat exchanger and the compressor.

6. The environmental control system of claim 5, wherein the airflow exchanges thermal energy with a ram airflow at one or more of the primary heat exchanger and the secondary heat exchanger.

7. The environmental control system of claim 1, wherein the turbine output airflow is output to an air cooling load after flowing through the liquid load heat exchanger.

8. The environmental control system of claim 1, wherein the liquid flow is output to a liquid cooling load after flowing through the liquid load heat exchanger.

9. The environmental control system of claim 1, wherein the compressor and the turbine are disposed at a common shaft.

10. A method of operating an environmental control system, comprising:

extracting an airflow from an airflow source;

compressing the airflow at a compressor of an air cycle machine into a compressed airflow;

exchanging thermal energy between the compressed airflow and a liquid flow at a liquid load reheater;

directing the compressed airflow through a turbine of the air cycle machine after flowing the compressed airflow through the liquid load reheater;

exchanging thermal energy between a turbine output airflow and the liquid flow at a liquid load heat exchanger after the turbine output airflow exits the turbine, and after the liquid flow exits the liquid load reheater; and flowing the compressed airflow through a condenser prior to directing the compressed airflow through the turbine, for thermal energy exchange with the turbine output airflow, thus condensing water from the compressed airflow;

wherein the turbine output flow flows through the condenser then flows through the liquid load heat exchanger.

11. The method of claim 10, further comprising flowing the compressed airflow through a regeneration heat exchanger disposed downstream of the compressor, prior to flowing through the liquid load reheater.

12. The method of claim 11, further comprising flowing the airflow through a primary heat exchanger disposed between the airflow source and the air cycle machine.

13. The method of claim 12, further comprising flowing the airflow through a secondary heat exchanger disposed between the regeneration heat exchanger and the compressor.

* * * * *